Figure 1:
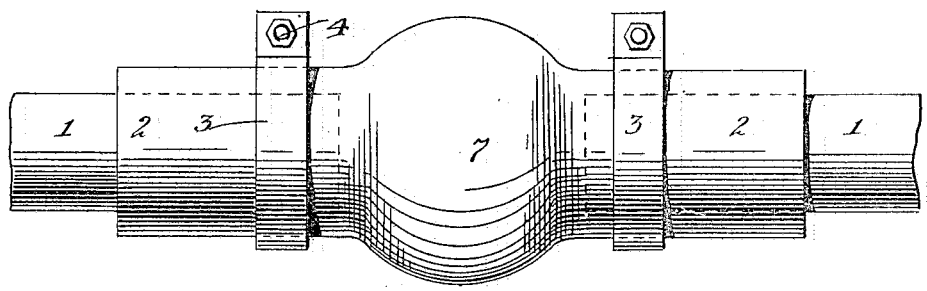

No. 809,903. PATENTED JAN. 9, 1906.
W. F. BOWERS.
DREDGER SLEEVE.
APPLICATION FILED APR. 28, 1905.

WITNESSES:
M. R. Seely
Celeste Ansell

INVENTOR:
William F. Bowers
by Spear & Seely
Attorneys

UNITED STATES PATENT OFFICE.

WILLIAM F. BOWERS, OF SAN FRANCISCO, CALIFORNIA.

DREDGER-SLEEVE.

No. 809,903.  Specification of Letters Patent.  Patented Jan. 9, 1906.

Application filed April 28, 1905. Serial No. 257,886.

*To all whom it may concern:*

Be it known that I, WILLIAM F. BOWERS, a citizen of the United States, residing at San Francisco, in the county of San Francisco and State of California, have invented certain new and useful Improvements in Dredger-Sleeves, of which the following is a specification.

The term "dredger-sleeve" is employed in the art of dredging to designate a flexible connection for joining two adjacent sections of the discharge-pipe which conveys material from the dredger to any place of deposit. The discharge-pipe is usually composed of a number of sections so connected together and supported upon floating pontoons arranged between the dredger and the shore. The action of winds, currents, and tides which cause the pontoons to change their position relatively to the dredger and to each other makes it necessary to employ such flexible connections which can bend and conform to the various angles assumed by the rigid pipe-sections. Heretofore these sleeves have been simple straight tubes formed of rubber and duck or canvas and of uniform diameter. To secure as high a degree of durability as possible, the sleeves are made very long, materials of good quality are generally used, and such sleeves are therefore expensive. Their first cost would not be a matter of serious objection if the desired durability could be obtained; but it has been found in practice that the strain in flexing and curving the straight rubber tubes soon causes them to tear and crack, producing leaks in the discharge-passage and making frequent and expensive renewals necessary. A further objection to the sleeve heretofore used is found in the fact that when they are flexed or curved one part of the tube is bent inwardly toward the opposite wall, so as to form an obstruction in the passage, which always to some extent and sometimes completely interferes with the flow of material. Such an obstruction to the flow puts the coupling under a heavy internal strain, which is additional to the external strain caused by the flexing and curving.

In the invention hereinafter described it has been my object to provide a novel construction of dredger-sleeves which entirely obviates the above objections, does away with any flexing strain, makes it impossible for the wall of the sleeve to obstruct the passage, enables a much shorter sleeve to be used, and provides a sleeve of much greater durability and which is more efficient and satisfactory in operation than those heretofore used.

The accompanying drawings show enough of a discharge-pipe to fully illustrate the construction and operation of my invention.

Figure 2:
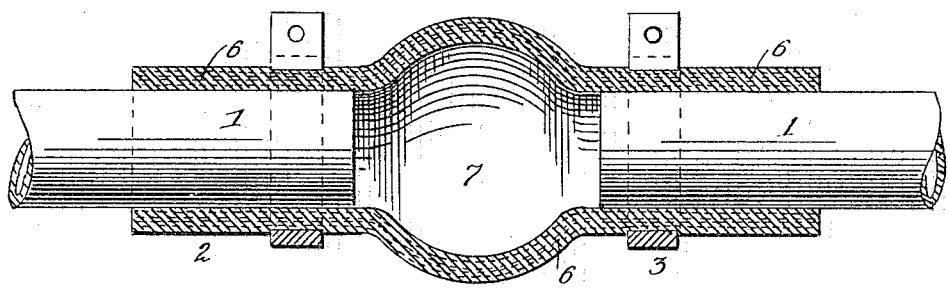
Figure 3:
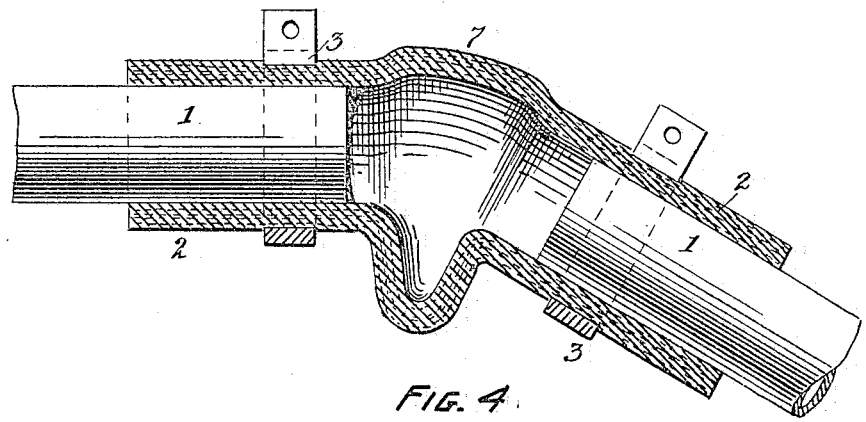
Figure 4:
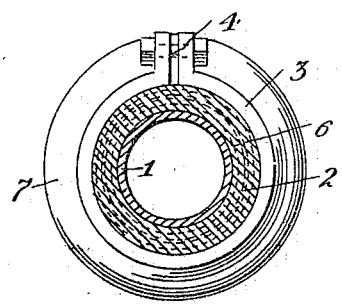

Figure 1 is an elevation of parts of two adjacent sections of a discharge-pipe with my sleeve in position. Fig. 2 is a longitudinal section of the sleeve in straight position. Fig. 3 is a similar section, illustrating the position of the sleeve when curved to conform to an angular relation of the pipe-sections. Fig. 4 is a cross-section on line $x\,x$ of Fig. 1.

The discharge-pipe is composed of any suitable number of metallic hollow sections, two of which, 1 1, are shown in the drawings. These sections are of any desired or necessary length and diameter, according to the situation in which they are used and the character and amount of material which is to pass through them. The adjacent ends of these sections are connected together by the sleeve 2, which surrounds said ends and the space between them and is secured to them in any suitable way. I have shown as practical securing means open-ring clamps 3, which surround the sleeve and are compressed upon it by means of bolts $4^a$. The sleeve is a tube of rubber molded to proper form and strengthened by plies 6 of textile material, such as duck or canvas. For the greater portion of its extent it is a single straight flexible tube which fits the exterior of the pipe-sections. The peculiar feature of its construction consists in forming it with an intermediate hollow bead or enlargement 7 of substantially frusto-spherical form. Such enlargement is an integral part of the tube, and the plies of textile material run continuously through it. This enlargement is not a thickening of the wall of the tube, but a lateral and preferably curved extension or projection of such wall, which is of uniform thickness with the cylindrical portions of the sleeve. In other words, the exterior and interior surfaces of the sleeve are parallel throughout their whole extent. When the sections of pipe are connected together, the enlargement 7 surrounds the space left between the sections, as shown.

The operation and advantages of my improved dredger-sleeve are illustrated in Fig. 2. When from any cause the adjacent sections of pipe change from a straight to an angular relation in any direction, the sleeve conforms to the change without bringing any increase of strain upon it by stretching, for, as will be observed in Fig. 3, the excess of material on the side where the pipe-sections diverge in forming the angle simply goes into the length of the sleeve to the extent made necessary by the size of the angle, and on the opposite side, instead of an inwardly-projecting kink in the wall, which would obstruct the passage, the outwardly-extending sides of the enlargement simply approach one another without in any way affecting the size of the passage. Thus the flexing of the sleeve, which puts a portion of an ordinary sleeve under a severe tensile strain, will in this case have only the effect of flattening or partly flattening the excess of material in a portion of the enlargement. The same results follow all changes in the relative positions of the pipe-sections, no matter in what direction. This provision for relieving the sleeve from strain allows comparatively short sleeves to be used.

While this sleeve is especially adapted and intended for use as a connection for the discharge-pipe sections of dredgers, it is evident that sleeves of substantially the same character and construction can be employed in any and all cases where a flexible connection for pipes is subject to be bent or curved by changes in the positions of the pipes which it connects or from other causes.

Having thus fully described my invention, what I claim as new, and desire to secure by Letters Patent, is—

A flexible pipe connection comprising two cylindrical rubber portions adapted to fit the pipe-sections to be connected and a single rubber bulbous enlargement intermediate of said cylindrical portions and integral therewith, substantially as described.

In testimony whereof I have affixed my signature, in presence of two witnesses, this 18th day of April, 1905.

W. F. BOWERS.

Witnesses:
L. W. SEELY,
CELESTE ANSELL.